United States Patent
Tsunoo

(10) Patent No.: US 6,272,221 B1
(45) Date of Patent: Aug. 7, 2001

(54) ENCRYPTION APPARATUS AND COMPUTOR-READABLE RECORDING MEDIUM CONTAINING PROGRAM FOR REALIZING THE SAME

(75) Inventor: Yukiyasu Tsunoo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/129,775

(22) Filed: Aug. 6, 1998

(30) Foreign Application Priority Data

Aug. 7, 1997 (JP) .................................................. 9-213274

(51) Int. Cl.⁷ .................................................. H04L 9/00
(52) U.S. Cl. .................................................. 380/28; 380/29
(58) Field of Search .................................. 380/28, 29

(56) References Cited

U.S. PATENT DOCUMENTS 5,442,705   8/1995   Miyano .................................. 380/29

FOREIGN PATENT DOCUMENTS

| 0 518 315 | 12/1992 | (EP) . |
| 0 618 701 | 10/1994 | (EP) . |
| 48-17234 | 3/1973 | (JP) . |
| 51-108701 | 9/1976 | (JP) . |
| 6-216897 | 8/1994 | (JP) . |
| 6-266284 | 9/1994 | (JP) . |

OTHER PUBLICATIONS

Ikeno et al.; "Modern Cryptography"; Electric Communication Society; p. 66 (1986).

Article by Hiroshi Miyano, "A Cipher Chaining Strong Against Known/Chosen Plaintext Attacks", pp. 13–17 (1993–03).

Primary Examiner—Tod Swann
Assistant Examiner—Ronald F. Sulpizio, Jr.
(74) Attorney, Agent, or Firm—Foley & Lardner

(57) ABSTRACT

The present encryption apparatus is provided with a plurality of conversion means connected in multiple steps, an intermediate-key generating means for performing linear or non-linear conversion for an intermediate-key and subsequently generating an initial-value of the intermediate-key, and an intermediate-key memory means for updating and storing the intermediate-key update information. The present encryption apparatus provides a ciphertext which is refractory to a chosen plaintext cryptanalysis in the evaluation of the key update information. The present apparatus is capable of high speed operation by parallel processing and is also capable of maintaining high speed operation by higher multiplication of the parallel operation even when the number of repetitive conversion is increased.

16 Claims, 9 Drawing Sheets

ENCRYPTION APPARATUS AND COMPUTOR-READABLE RECORDING MEDIUM CONTAINING PROGRAM FOR REALIZING THE SAME

BACKGROUND OF THE INVENTION

1. Field of the Invention

This invention relates to an encryption apparatus capable of keeping data-confidentiality in data communication or data accumulation and relates also to a recording medium for recording a program for realizing the above encryption apparatus.

This application is based on Patent Application No. Hei 9-213274 filed in Japan, and the content of which is incorporated herein by reference.

2. Background Art

A representative example of common-key cryptosystems (one example is disclosed in Japanese Patent Application, First application No. 51-108701, "Encryption Apparatus") is a cryptosystem called DES (Data Encryption Standard). The DES is characterized in that it realizes a complicated encryption by repeating comparatively simple conversion processing. A variety of improvements are proposed in order to secure higher confidentiality of ciphers.

An example of such systems is the CBC mode of DES (disclosed in, for example, "Modern Cryptography" edited by Shinichi Ikeno and Kenji Koyama, an explanation of which is described in "Electronic Communication Society" p.66 (1986)). The CBC mode of DES is developed so as to make it difficult to perform decryption of the cipher, due to the fact that encryption of a block of the plaintext is affected by a result of the preceding encryption, and, as a result, the statistical characteristics of the plaintext are altered.

However, this cryptosystem has unsolved drawbacks in that encryption of one block cannot start unless encryption of the previous block is completed, and, in that there is still remaining a danger that this system suggests clues to a cryptoanalyst who intend to decrypt a cipher, since this system uses the same key for encryption of a number of blocks, which results in lack of confidentiality.

One of measures for solving these drawbacks is proposed as the "cipher chaining system", disclosed in Japanese Patent Application, First Publication No. Hei 6-266284. The cipher chaining is a system in which an intermediate-key for acting on a conversion means performing encryption is updated for every plaintext according to an initial-value and a parcel of update-information of the intermediate-key.

However, this system is provided with only one series of initial-values for the intermediate-key.

In the conventional cipher chaining system, when a chosen plaintext cryptanalysis is performed by inputting the same plaintext successively, since all of the intermediate-key update-information is identical, and since the initial-value of the intermediate-key is fixed, the intermediate-key will not be updated. Consequently, there is a remaining danger that one can identify a change whether or not the intermediate-key is updated by observing the cipher while inputting the same plaintext successively.

Therefore, it is the object of the present invention to provide an encryption apparatus, which does not give a large tract of ciphertext encrypted by the same key and which makes it difficult for a cryptoanalyst to presume the intermediate-key update information stored in the apparatus. The encryption apparatus of the present invention is capable of high speed encryption by a parallel encryption system, and is also capable of maintaining an encryption speed, because it is possible to adopt a multiple parallel encryption mode in the case when there is the number of steps for a repetitive conversion.

SUMMARY OF THE INVENTION

The first embodiment of the present invention provides an encryption apparatus for producing a ciphertext string corresponding to a plaintext string based on an encryption key, said apparatus comprising:

at least one conversion means for performing linear or non-linear conversion of the bit strings;

an intermediate-key generating means for generating an initial-value of the intermediate-key by performing linear or non-linear bit-string conversion for an inputted intermediate-key;

an intermediate-key memory means for updating and storing the intermediate-key using an intermediate-key update-information;

wherein at least one of said conversion means forms a pair with said intermediate-key memory means, at least one of said paired conversion means is subjected to control of an intermediate-key stored in said intermediate-key memory means and generates an intermediate-key update-information for updating the intermediate-key whenever the bit string conversion is performed and transmits said intermediate-key update-information to said intermediate-key memory means forming a pair with said conversion means; said intermediate-key memory means stores a predetermined number of at least one of initial-values which is delivered from said intermediate-key generating means; and said apparatus comprising a selecting means for selecting at least one initial-value among initial-values stored in said intermediate-key memory means whenever the conversion of a bit string is performed, controlling the conversion means in a pair and updating the intermediate-key based on said intermediate-key update-information.

The first embodiment is characterized in that a bit string (an intermediate-key) for controlling the encryption conversion is updated whenever the encryption is carried out. This brings a result that the intermediate-key is updated whenever the encryption of a block is completed; thereby, a cryptoanalyst cannot obtain a large tract of ciphertexts which use the same key. Particularly, since at least one intermediate-key is provided and since the intermediate-key is updated by use of different initial-values, it becomes more difficult to perform decryption when compared with the conventional example in which the initial value is limited to one.

The second embodiment of the present invention provides an encryption apparatus, which is modified from the first embodiment in that said intermediate-key memory means stores a predetermined number of at least one parcel of the intermediate-key update-information delivered in the past; deletes an oldest intermediate-key update-information whenever receiving new intermediate-key update-information, and generates an intermediate-key to transmit to the following conversion means from a set of parcels of the intermediate-key update-information and a set of the intermediate-key initial-values as an input.

The second embodiment is characterized in that both the intermediate-key initial-values and the intermediate-key update-information are stored in a plurality of buffers, so that it is possible to suppress during communication the passing of bit errors to following bits.

The third embodiment of the present invention is an encryption apparatus which is modified from the first embodiment in that the intermediate-key memory means provided with more than two conversion means and being coupled with another conversion means in addition to the conversion means which originally forms a pair comprises a selection means to select intermediate-key update-information and an initial-value of the intermediate-key from a set of parcels of intermediate-key update-information and a set of initial-values of the intermediate-key and generates an intermediate-key to be transmitted to the following conversion means by inputting at least one parcel of selected intermediate-key update-information or at least one of initial-values, or at least one parcel of selected intermediate-key update-information and at least one of initial-values.

The third embodiment of the present invention is characterized in that the initial-values and the update-information of the intermediate-key stored in the intermediate-key memory means are delivered not only to the conversion means paired with the memory means, but also to the other conversion means, so that the types of updated intermediate-key are increased and decryption is rendered difficult.

The fourth embodiment of the present invention provides an encryption apparatus which is modified from the first embodiment in that the intermediate-key memory means provided with more than two conversion means and being coupled with another conversion means in addition to the originally coupled conversion means comprises a selection means to select intermediate-key update-information or an initial-value of the intermediate-key or a combination of at least one parcel of an intermediate-key update-information and an initial-value of the intermediate-key from at a set of parcels of the intermediate-key update-information and a set of initial-values of the intermediate-key, and said selection means controls so as not to select at least one of said intermediate-key update-information or an initial-value of the intermediate-key or a combination of at least one parcel of said intermediate-key update-information and an initial-value of the intermediate-key repeatedly more than the number of conversion means.

The fourth embodiment of the present invention is characterized in that the updating cycle of the intermediate-key is limited to below the repeating number of the common-key encryption system, so that the internal updating of the intermediate-key does not take place (all the key update information becomes identical); thereby, decryption is rendered difficult.

The fifth embodiment of the present invention provides an encryption apparatus which is modified from the first embodiment in that, when said conversion means generates intermediate-key update-information for updating the intermediate-key, said conversion means updates said intermediate-key update-information based on a bit strings among bit strings for its input excluding the intermediate-key to control said conversion means to said conversion means and transmits the intermediate-key update-information to said intermediate-key memory means, and said intermediate-key update means sets a condition in advance whether or not the updated intermediate-key is used for converting data blocks which adopted said intermediate-key update-information.

The fifth embodiment of the present invention is characterized in that data for the update information of the intermediate-key is taken out from the input data of the conversion means, so that the updated intermediate-key can be applied both when performing conversion of said input data and when performing conversion of input data following said input data, which results not only in an increase in the types of the intermediate-key generated by updating, but also enables shifting the application timing; thereby decryption is rendered difficult.

The sixth embodiment of the present invention provides an encryption apparatus which is modified from the first embodiment in that, when said conversion means generates intermediate-key update-information for updating said intermediate-key update-information, said conversion means updates said intermediate-key update-information based on a bit string generated in the course of producing the output bit strings from the input bit strings, and said conversion means transmits the intermediate-key update-information to said intermediate-key memory means, and a condition is set in advance about whether or not the updated intermediate-key updated by said intermediate-key update means is used for conversion of data blocks which adopted said intermediate-key update-information.

The sixth embodiment of the present invention is characterized in that the data for generating the intermediate-key update information are obtained in the course of the conversion by the conversion means, so that the updated intermediate-key may be applied for performing the subsequent conversion processes as well as for converting following data blocks from said conversion. Thus, types of the intermediate-key may be increased and application timing of the intermediate-key can be shifted; thereby, decryption is rendered difficult.

The seventh embodiment of the present invention provides an encryption apparatus which is modified from the first embodiment in that, when said conversion means generates intermediate-key update-information for updating said intermediate-key, said conversion means updates said intermediate-key update-information based on an output bit string of the conversion means, and transmits the intermediate-key update-information to said intermediate-key memory means, and a operating condition of the conversion device is set in advance about whether or not the updated intermediate-key updated by said intermediate-key update means is used for conversion of data blocks which adopted said intermediate-key update-information.

The seventh embodiment of the present invention is characterized in that the data for the intermediate-key update-information is taken from the output data of the conversion means, so that it is possible to use the update information mixed by said conversion means; thereby, it is rendered difficult to presume intermediate-keys.

The eighth embodiment of the present invention provides an encryption apparatus which is modified from the first embodiment in that a plurality of plaintexts can be processed simultaneously by operating each of said conversion means in parallel.

The eighth embodiment of the present invention is characterized in that the apparatus is preferably designed to realize the parallel operation such that, when the processing by the conversion means at the first step is completed and the intermediate-key is updated, the following step is ready to receive an input for processing without waiting for completion of the processing at the subsequent step.

BRIEF DESCRIPTION OF THE DRAWINGS

The preferred embodiments of the present invention will be described referring to following drawings.

DETAILED DESCRITION OF EMBODIMENTS

Figure 1:
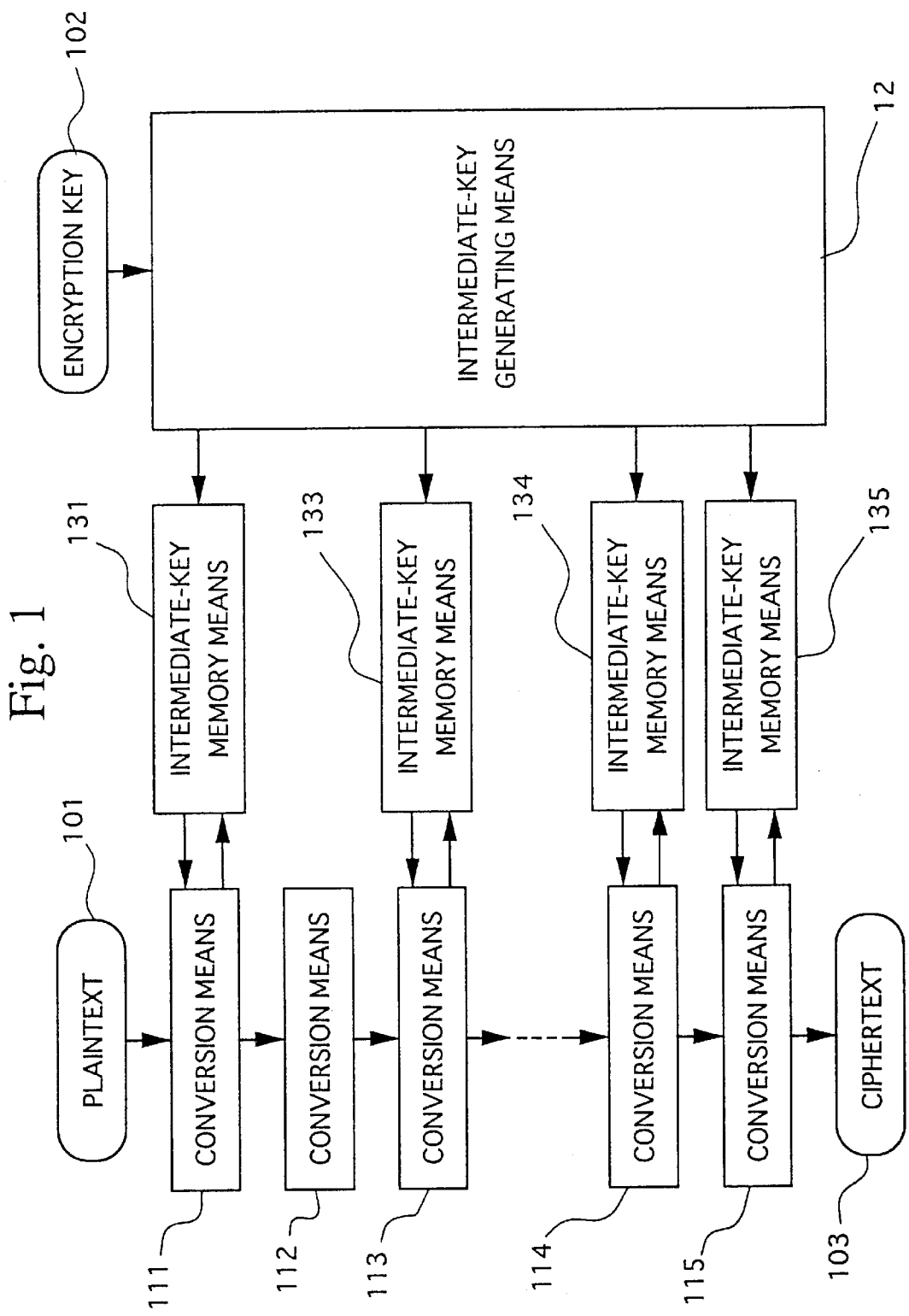
FIG. 1 is a conceptual diagram of a cipher chaining system.
Figure 2:
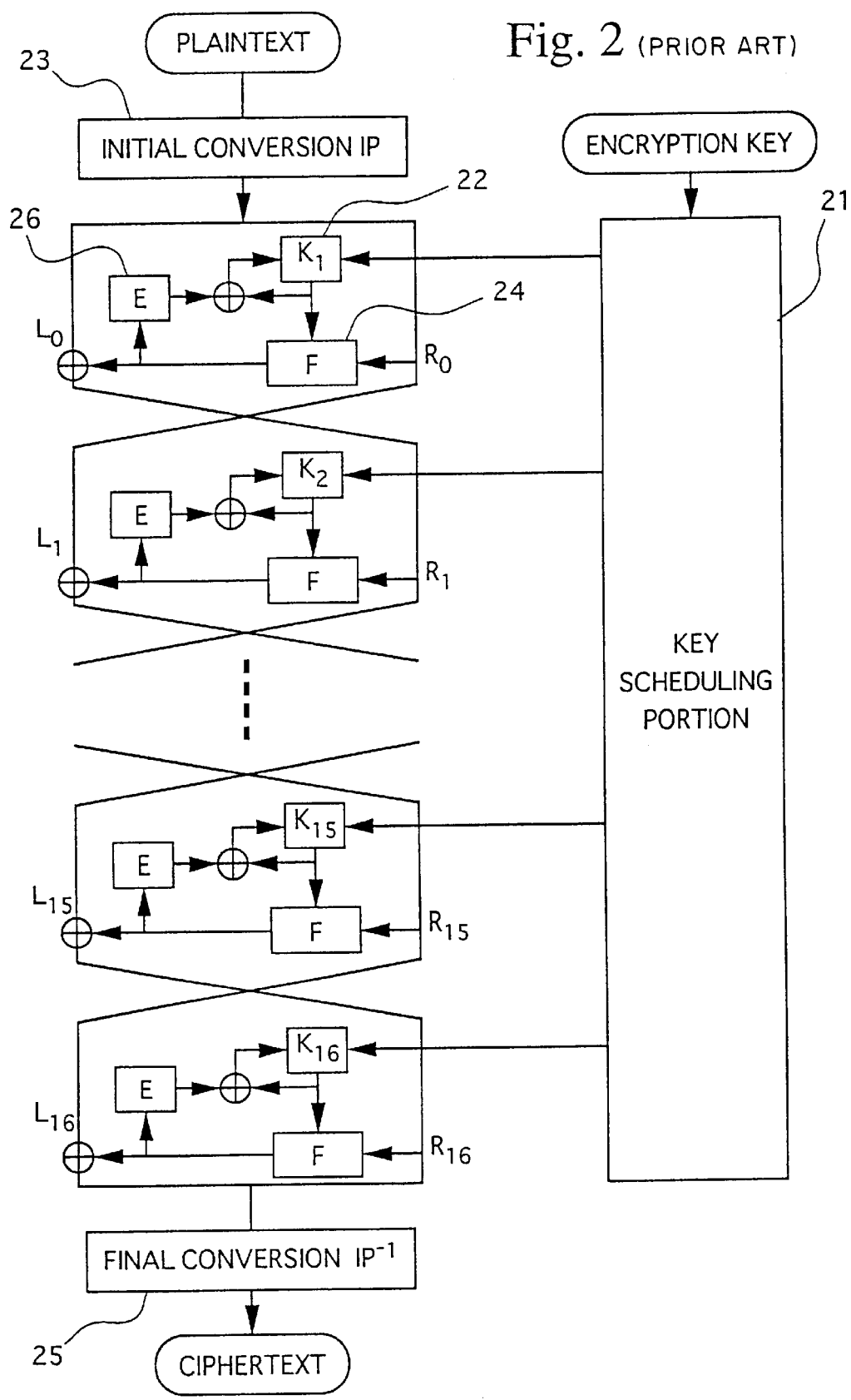
FIG. 2 shows a block diagram of an example of a modified DES constructed by applying the cipher chaining system disclosed in Japanese Patent Application, First Publication No. Hei 6-266284.
Figure 3:
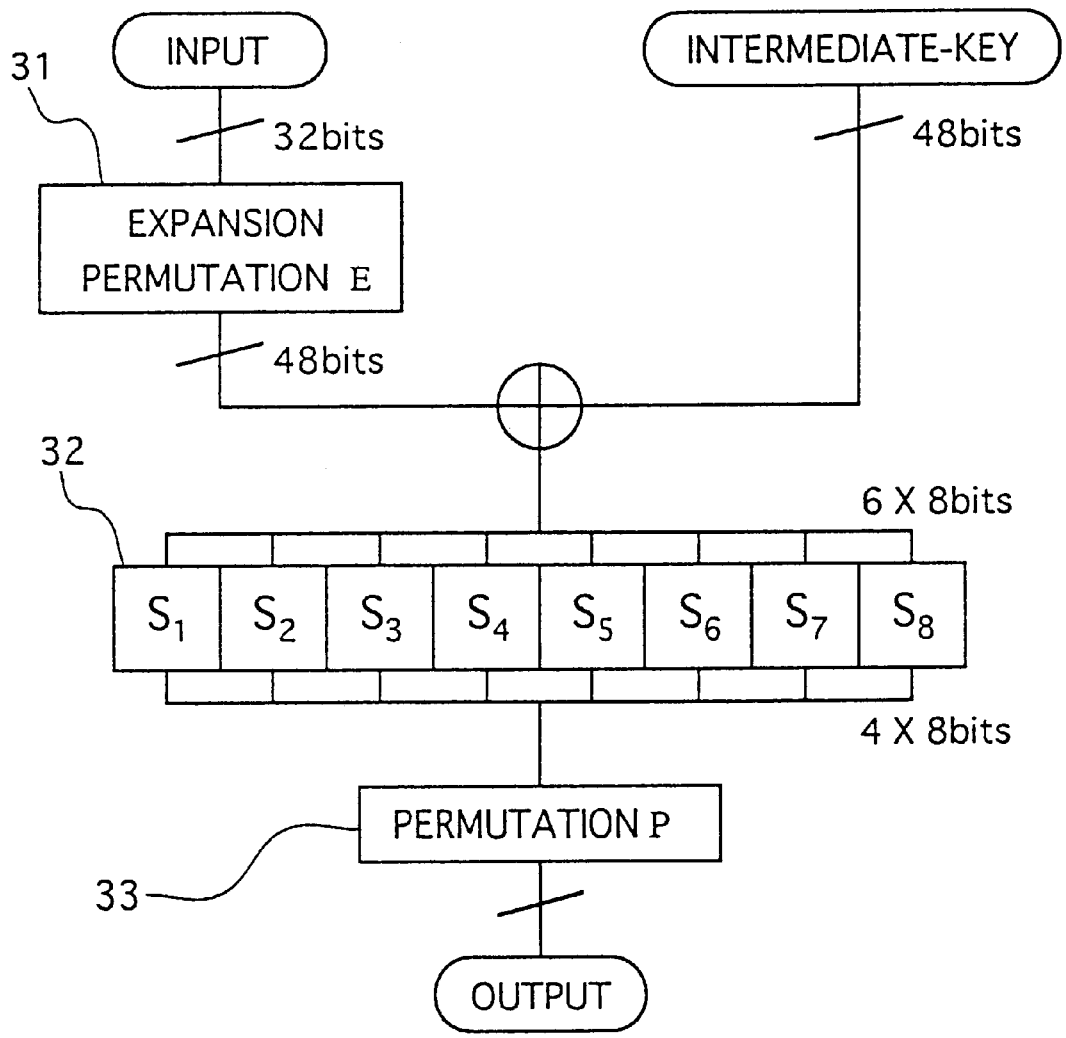
FIG. 3 shows a F-function of DES disclosed in Japanese Patent Application, First Publication No. Hei 6-266284.
Figure 4:
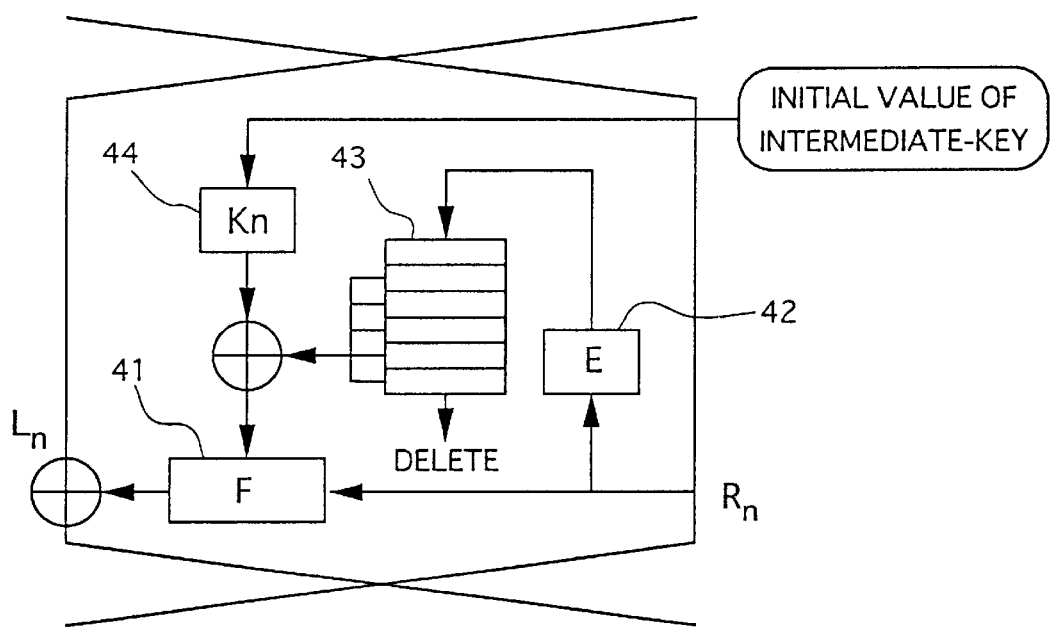
FIG. 4 shows a key update system disclosed in Japanese Patent Application, First Publication No. Hei 6-266284.

FIG. 1 is a block diagram showing a first embodiment of the present invention. FIGS. 2, 3, and 4 are diagrams for explaining a system disclosed in Japanese Patent Application, First Publication No. Hei 6-266284. The features of the present invention are described referring to those figures.

As shown in FIG. 1, a bit string called a plaintext is taken into the apparatus, a conversion operation is carried out by at least one conversion means 111 to 115 connected in series, and finally a cipher is output. Each conversion means 111 to 115 is not necessarily required to have an identical function. The conversion means 111 to 115 possess a function to perform a linear or non-linear conversion of the bit string, and this function is controlled by an intermediate-key which is stored in a memory means 131 to 135 associated with each conversion means. Furthermore, the conversion means 111 to 115 also possess a function to generate update-information whenever conversion of a bit string is performed and to transmit the update-information to the intermediate-key memory means.

On the other hand, a bit string called a "key" generates an intermediate-key initial-value in an intermediate-key generating means 12 by giving the key a linear or non-linear conversion, and transmits the intermediate-key to the intermediate-key memory means.

The intermediate key memory means 131 to 135 possess functions, beside storing the intermediate-key, to control the conversion means by transmitting the intermediate-key to the conversion means, to receive the intermediate key update-information generated and transmitted by the conversion means, and to update the intermediate-key under the control of said update-information.

Figure 5:
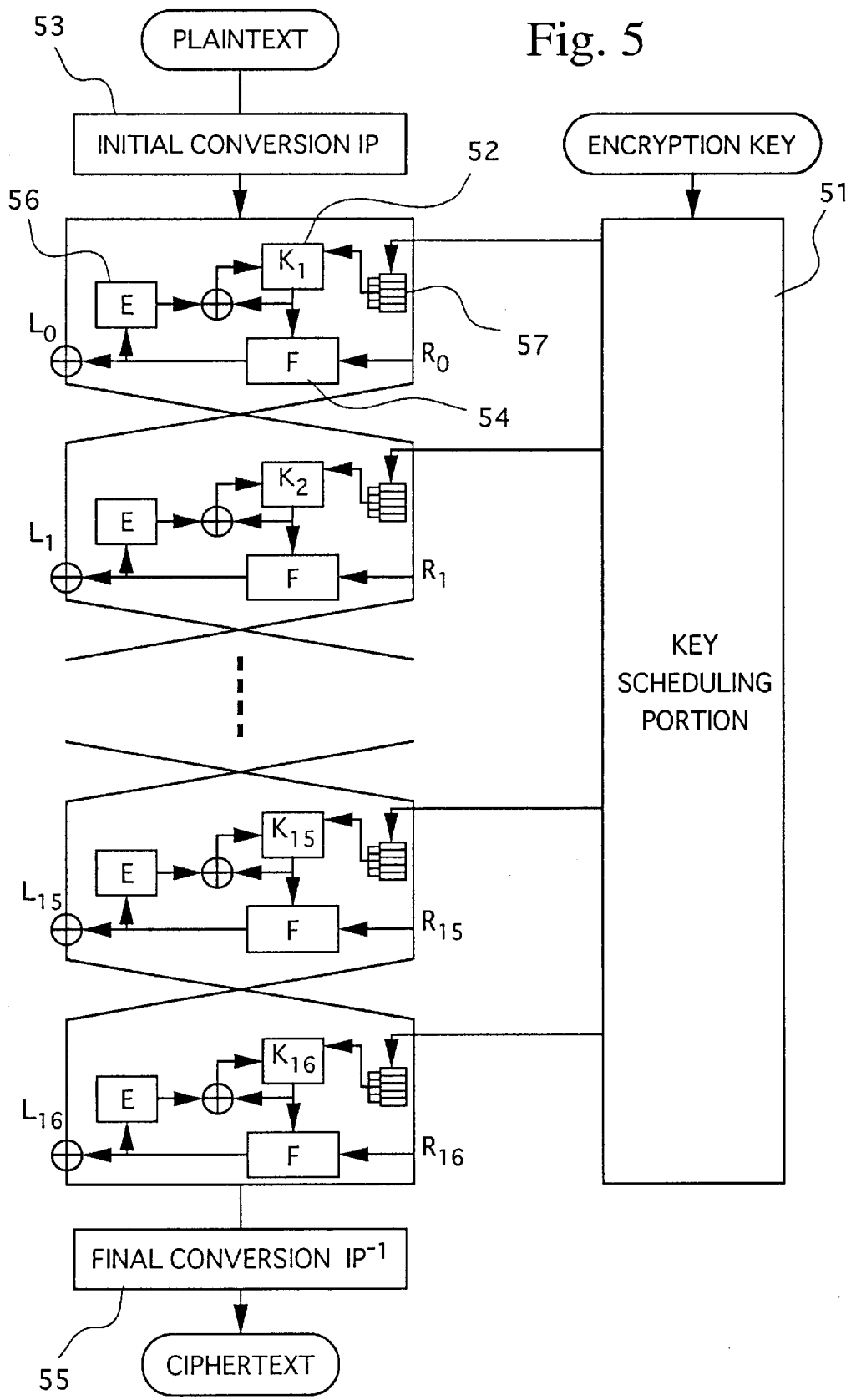
FIG. 5 shows an embodiment of a modified DES of the present invention constructed by applying the present enciphering system.

FIG. 2 shows a block diagram of an example of a modified DES, formed by applying the cipher chaining system disclosed in Japanese Patent Application, First Publication No. Hei 6-266284. FIG. 3 shows the F-function of the DES. FIG. 5 is a block diagram of a first embodiment of the present invention showing an encryption system constructed by applying a cipher chaining system to the DES. When FIG. 2 is compared with FIG. 5., the system in FIG. 5 differs from that of FIG. 2 in that it is provided with a memory 57 in each step. The modified DES shown in FIG. 2 comprises a key scheduling portion 21, an intermediate key memory portion 22, an initial permutation IP 23, a F function 24, a final permutation $IP^{-1}$ 25, and an expansion permutation 26.

A key scheduling portion or a key scheduler 51 correspond to the intermediate-key generating means 12 in FIG. 1. First, a 64 bit encryption key is inputted into the key scheduling portion 51. The key scheduling portion 51 outputs an initial-value of the intermediate-key based on the input encryption key and transmits it to the memory 57 for storing the initial-value of the intermediate-key. The intermediate-key is composed of 4608 bits (in this case, the number of the intermediate-key initial-values is 6 times larger than those of DES) in total, consisting of 48 bits×16 pieces corresponding to 16 data conversion devices called the F-function installed in the encryption portion, which will be described hereinafter.

The scheduler of the DES disclosed in detail in Japanese Patent Application, First Publication No. Hei 6-266284 is briefly described hereinafter.

In the key scheduling portion 51 generates initial-values of the intermediate-key for the F-function by combining a contraction type permutation PC-1 which outputs 56 bits from 64 bits, a contraction type permutation PC-2 which outputs 48 bits from 56 bits, and a cyclic shifting operation. In the key scheduling portion 51, first, an input encryption key is subjected to the contraction type permutation PC-1 to obtain an output composed of 56 bits. This output of 56 bits is divided into a front half of 28 bits and a back half of 28 bits. After each of the 28 bits of front and back halves are subjected to cyclic shifting operations for a predetermined number of times, the 48 bits obtained by being subjected to the contraction type permutation PC-2 is used as one initial-value (represented as Kn) of the intermediate-key. The number of cyclic operations for each step is predetermined. Six values obtained after executing the predetermined number of cyclic shifting operations such as $Rot_x$ (kn), (where, x represents shifting numbers, 1, 3, 5, 7, and 9) are used as intermediate-key initial-values at respective n-the steps, that is, outputs of the key scheduling portion 51. In this example, the $Rot_x$ (Kn) is used as an generating function, but it should be understood that the other appropriate functions may be used.

The term encryption portion designates a whole portion of the encryption apparatus of the present embodiment excluding the key scheduling portion. The encryption portion comprises an initial permutation IP53, a final permutation $IP^{-1}$55, sixteen F-functions 54, and further comprises sixteen expansion permutations, sixteen intermediate-key update memories 52 (in this embodiment, a memory is set to store six intermediate-key initial-values), transmission lines for processing data stored in the memories, and a calculator for calculating the exclusive OR.

After the processing in the key scheduling portion 51 is completed, and once an initial-value of the intermediate-key for each F-function are set, a first 64 bits at the head of the plaintext are inputted into the encryption portion. The input of 64 bits is first subjected to the initial permutation IP 53. The initial permutation IP53 is a rearrangement of bit strings along with a predetermined table values. An output of 64 bits of the initial permutation is divided into a front half of 32 bits and a back half of 32 bits. Assume 32 bits of the front half is $L_0$ and 32 bits of the back half is $R_0$. Based on the assumption, $L_1, R_1, L_2, R_2, \ldots, L_{16}$, and $R_{16}$ are generated in sequence according to the following equation.

$$L_n = R_{n-1}$$
$$R_n = L_{n-1} \text{EXOR F } (R_{n-1}, K_n)$$

where, EXOR is the exclusive OR, F is the F-function 54 described hereinafter, $K_n$ represents the intermediate-key stored in the memory 52 at the n-th F-function. The intermediate-key is, as an initial-value, one piece among values generated by the above key scheduling portion 51, but the intermediate key is updated whenever the computation is carried out using the F-function. For 64 bits comprising $L_{16}$ and $R_{16}$ are then subjected to the final permutation $IP^{-1}$55, and the resultant output is made to be the top 64 bits of a cipher document corresponding to the original plaintext document. The final permutation $IP^{-1}$55 is a rearrangement operation of bit strings according to the predetermined table values.

In this embodiment, the conversion means shown in FIG. 1 includes the initial permutation, the final permutation, and the operation to obtain from $L_{n-1}, R_{n-1}$ to $L_n, R_n$. The intermediate-key of the F-function is updated by a method described hereinafter.

Subsequently, the next 64 bits of the plaintext is inputted into the encryption portion, and 64 bits of the cipher is generated according the same procedure as that shown above and the intermediate-key of the F-function is updated. The above procedures are successively repeated until the whole plaintext is converted into the ciphertext.

16 F-functions have the same structure and output 32 bits from the input of 32 bits under a control of an intermediate-key composed of 48 bits. The structure of the F-function is shown in FIG. 3. Although operations of the F-functions shown in FIG. 3 are disclosed in detail in Japanese Patent Application, First Publication No. 6-266284, an abstract will be described here. An expansion permutation E31 is a selection operation to output 48 bits out of 32 bits allowing duplication following the predetermined table values. An input of 32 bits of the F-function is expanded into 48 bits by the expansion permutation and the output of 48 bits are divided into eight blocks each having 6 bits, after the exclusive OR is processed for every bit with the intermediate-key. The resultant 48 bits are divided into eight blocks each being composed of 6 bits.

These eight blocks 32 are made the inputs of respective S-Boxes comprising S1, S2, ...S8. The input of each S-box is 6 bits and each S-box outputs 4 bits. Thus, the S-box plays a role of a conversion operation by selecting 4 bits as an output, according to an predetermined table, and the input of 6 bits.

An output composed of 32 bits in total consisting of 4 bits of eight S-boxes are subjected to permutation by the permutation P33. An output of the permutation P33 forms an output of each F-function. The permutation P33 is a rearrangement operation of bit strings.

Figure 6:
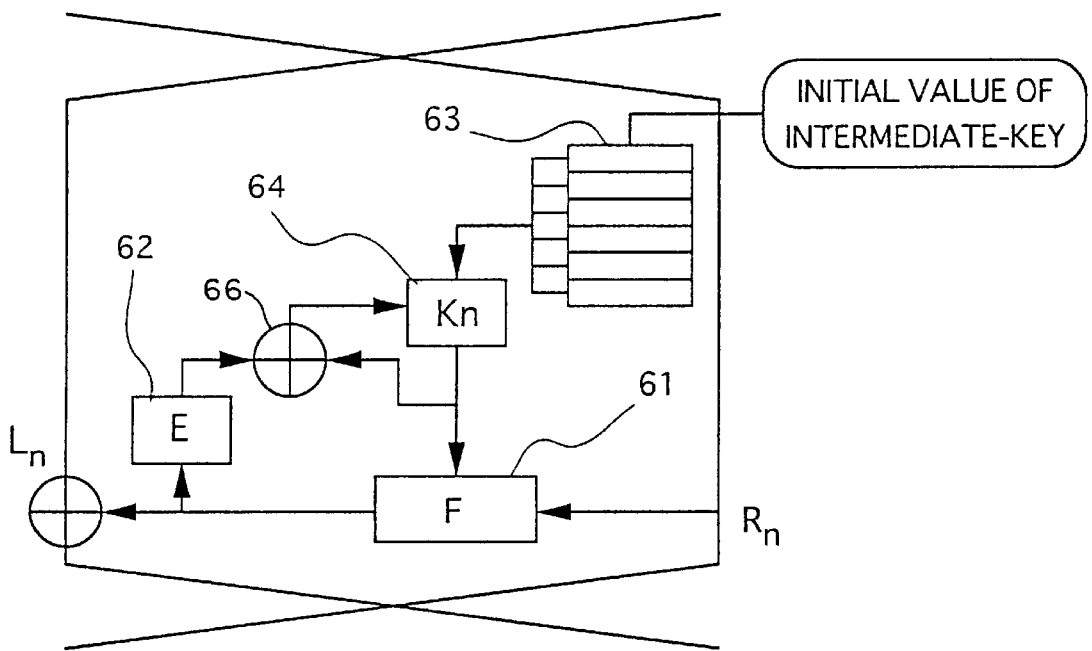
FIG. 6 shows a key update system of the present invention which comprises a plurality of initial-values of the intermediate-key.

FIG. 6 shows a enlarged view of one of the repeating processing in FIG. 5. An intermediate-key update memory 64 in FIG. 6 corresponds to the intermediate-key update memory 52 in FIG. 5. Similarly, the F-function 61 corresponds to the F-function 54, the expansion permutation E62 corresponds to the expansion permutation E56, and the intermediate-key initial-value memory 63 for storing more than one initial-value of the intermediate-key corresponds to the initial-value memory 57.

The intermediate-key of the F-function is updated in the intermediate key update means 66, by the following equation, whenever a operation by the F-function is performed, and the updated intermediate-key is stored in the intermediate-key update memory 64.

$K_{new} = K_{old}$ EXOR E(O) EXOR Sel (E(O), a set of initial-values of the intermediate-keys)

Here, $K_{new}$ is the new intermediate-key, $K_{old}$ is the old intermediate-key, and the output obtained by the processing using the F-function is assigned to be O. Sel (x, a set of initial-values of the intermediate-key) represents an operation to select an intermediate-key from values stored in more than one initial-value memory 63 according to a value of x, and E( ) represent the expansion permutation to output 48 bits from an input of 32 bits.

Sel (x, a set of initial-values of the intermediate-key) is a predetermined operation, one example of which is to select a value according to the rest of a division of x by the number of an initial value in a set of the intermediate-key initial-values. According to this embodiment, the number of the initialvalue is predetermined to be 6; thus, if x is 13, the first initial-value is selected. If x is 9, the third initial-value is to be selected. A particular operation, which neglects the value of x, may be used. Another possibility is an operation using a plurality of initial-values, in which, values of Sel (x, a set of initial-values of the intermediate-key) are produced by calculating the exclusive ORs of x and the first and second initial-values.

Particularly, when values of Sel (x, a set of initial-values of the intermediate key) are produced using a plurality of initial-values, the bit number of $K_{new}$ is less than the total bit number of the initial-value of the intermediate-key. In this case, if it is desired to calculate inversely an initial-value of the intermediate-key from $K_{new}$, a solution cannot be determined definitely because a plurality of candidates appear.

The favorable feature of the present invention is in that the present invention has introduced a system to update the intermediate-key using a set of the intermediate-key initial-values. The above method to update the intermediate-key is only an example. The above method is an example of constructing a system by applying the present feature into DES. However, the present method may be applied to any encryption system, if the system belongs to the category of a general cryptosystem repeatedly using the common key.

It is apparent from the comparison of FIG. 5 with FIG. 2 that the apparatus disclosed in Japanese Patent Application, First Publication No. 6-266284 is processed under a condition (1), in which the number of the intermediate-key initial-value generated by the intermediate-key generating means 12 is decided to be one for every intermediate-key memory means. In the present invention, however, the types of the intermediate-key obtainable after the updating operation can be drastically increased by adding intermediate-key initial-value memories 57 for storing more than one initial-value of the intermediate-key (each memory of the present embodiment stores 6 initial-values).

Hereinafter, the second embodiment of the present invention will be described referring to FIG. 7. In this embodiment, the first embodiment is modified by changing the structure of the intermediate-key update processor which generates an intermediate-key for supplying intermediate-key update-information to the following conversion means after receiving the intermediate-key update information from the previous conversion means. Furthermore, the intermediate-key update processor stores the predetermined number of at least one parcel of the intermediate-key update-information, deletes the oldest update-information whenever receiving the new update-information, and generates a new intermediate-key to be transmitted to the subsequent conversion means based on an input composed of a set of intermediate-key update-information parcels and a set of the intermediate-key initial-values.

Figure 7:
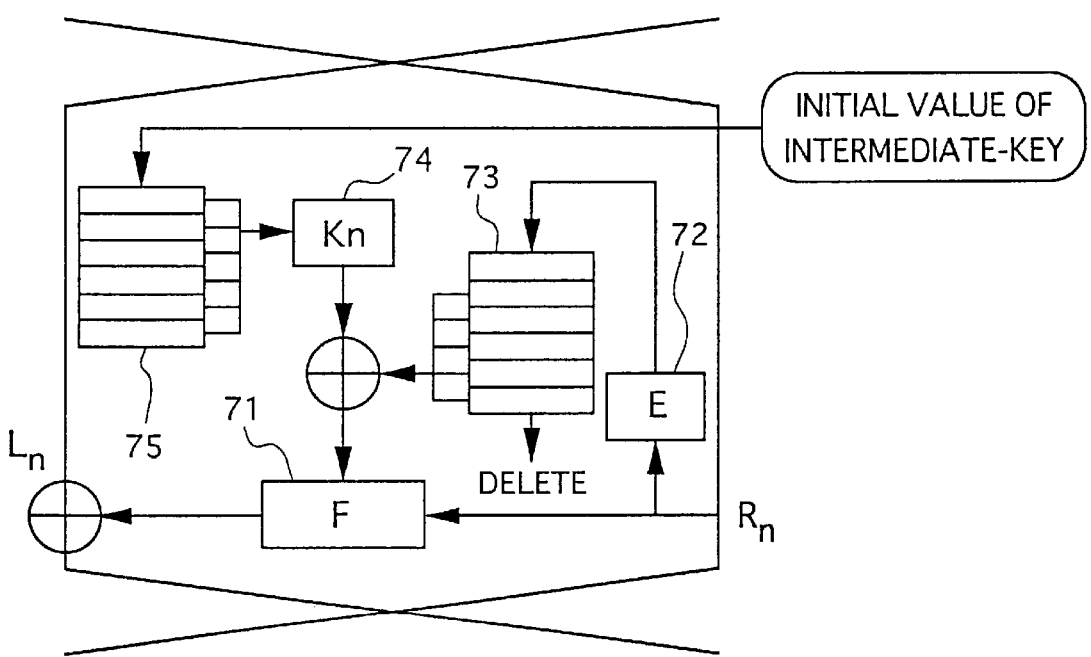
FIG. 7 is a first diagram depicting the key update system of the present invention which uses a plurality of update-information parcels.

FIG. 7 shows a modified step of the encryption portion among a plurality of repeating steps. The F-function 71 and the expansion permutation E72 are the same as the F-function 61 and the expansion permutation E62 in the first embodiment. The initial-value memory 75 for storing more than one intermediate-key initial-value is the same as the initial-value memory 63 in the first embodiment. The second embodiment of the present invention uses an input of the F-function as the intermediate-key update-information, and stores the update-information after being subjected to the expansion permutation in the update-information memory 73 of the intermediate-key which holds more than one update-information. The initial-values of the intermediate-key generated by the key scheduler are stored in the initial-value memory 75.

In the embodiment shown in FIG. 7, six parcels of information including the newest stored information are stored in the update-information memory.

The oldest parcel of information is an input of the F-function after being executed the expansion permutation at a step of the repeating processing for a plaintext block which is encrypted 5 blocks earlier. The intermediate-key for controlling the F-function is obtained from an operation of the exclusive OR for each bit between five parcels of information among the above six parcels of information except the newest information generated by the input to be processed by the F-function, and one of the intermediate-key initial-values selected from a set of the intermediate-key initial-values stored in the initial-value memory 75 after generated at the initial encryption stage by the key scheduling section.

That is, in the present embodiment, the update processing portion 74 processes for selecting an initial-value by cycling through the initials values stored in the initial-value memory of the intermediate-key, for example, 1, 2, . . . ,6 and 1. The operation of the intermediate-key update processor 74 is described as to the embodiment shown in FIG. 6. It is possible for the processor 74 to perform a predetermined operation such as Sel (x, a set of initial-values of the intermediate-key). The intermediate-key for the F-function is obtained by calculating the exclusive ORs of the initial-values derived from the intermediate-key processor 74 and the intermediate-key update-information derived from the intermediate-key update-information memory 73. When a processing of the F-function is completed under the control of said intermediate-key and the repeating steps receives the next input of the F-function, the new information is additionally stored in the update-information memory 73 and the oldest information is deleted.

For comparison, a brief description will be given of the key update system disclosed in Japanese Patent Application, First Publication No. Hei 6-266284. The intermediate-key update-information memory 43 stores a plurality parcels of the intermediate-key update-information the number of which corresponds to the number received in the past (in FIG. 4, the number is 6). Furthermore, the old intermediate-key update-information is deleted and the intermediate-key to be transmitted to the conversion means is generated from a stored set of information and the initial-value of the intermediate-key.

It is understood from a comparison of FIG. 4 with FIG. 5, that the invention disclosed in Japanese Patent Application, First Publication No. Hei 6-266284 is executed under a condition (1) that the initial-value of the intermediate-key generated in the intermediate-key generating means 12 is one for each intermediate-key memory means. In contrast, since the present invention additionally comprising more than one intermediate-key initial-value memory means 57 (the present embodiment comprises 6), the types of the intermediate-key after updating increases drastically.

The apparatus disclosed in Japanese Patent Application, First Publication No. Hei 6-266284 is also executed under the condition (2) that the updating of the intermediate-key is performed after the operation of the conversion means. That is, assuming that a block of data is inputted at a time t, and the updating operation is also performed at the time t, the updated key is only effective for data blocks generated since the time (t+1) (which means that the key cannot act on the data block at time t).

The above condition is excluded by the fifth and sixth embodiments of the present invention described in the later parts of this application.

Another example of the second embodiment will be described hereinafter. This is a modified form of the second embodiment, which is hereinbefore described with reference to FIG. 7. This example is modified so as to provide a function that the content of the intermediate-key update-information memory is rewritten in sequence, in the processing of generating an intermediate-key for transmitting an intermediate-key update information to the conversion means for subsequent conversion after receiving the intermediate-key update-information generated by each conversion means.

Figure 8:
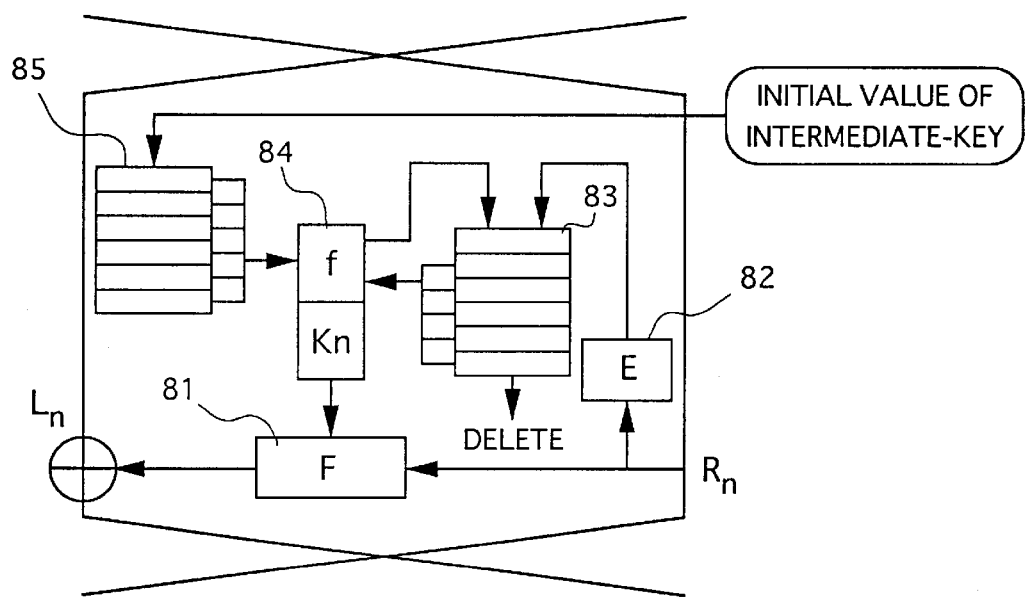
FIG. 8 is a second diagram depicting the key update system of the present invention which uses a plurality of update-information parcels.

FIG. 8 shows one of the repeating steps for encryption which are modified from those of the first embodiment. The F-function 81 and the expansion permutation E82 are the same as the F-function 61 and the expansion permutation E62 of the first embodiment, respectively, and the intermediate-key initial-value memory 85 are the same as the former intermediate-key initial-value memory 75. In this embodiment, the input of the F-function is used as the intermediate-key update-information, which is, after performing the expansion permutation, stored in the intermediate-key update-information memory 83. In addition, initial-values of the intermediate-key generated by the key scheduler is stored in the intermediate-key initial-value memory 85.

In the example shown in FIG. 8, six parcels of information including the newest stored ones are to be stored. That is, the oldest information is the input of the F-function after application of the expansion permutation at a repeated steps where encryption is carried out for a plaintext block which is input five blocks earlier. The intermediate-key update processing portion 84 for generating 48 bits of the intermediate-key generates the intermediate-key for controlling the F-function, based on the inputs of five parcels of information excluding the newest information generated so as to be processed using the F-function, and the set of initial-values of the intermediate-key stored in the initial-value memory 85. At the same time, six parcels of information are updated.

An example of the operation of the intermediate-key update processing portion 84 is described hereinafter. An initial-value is selected from the initial-values of the intermediate-key stored in the intermediate-key initial-value memory 85 according to the storing order, and the selected initial-value is named $wk_1$. Next one parcel of the oldest intermediate-key update-information is selected from initial-values stored in the intermediate-key update-information memory 83, and is named $wk_2$. Calculating Kn by the equation $Kn = wk_1 + wk_2$, Kn is made as the intermediate-key. Furthermore, all of initial-values of the intermediate-key update-information are applied Kn to obtain exclusive ORs. This process is one of the modified examples of operations f, and a different processing may be used.

By this conversion, the intermediate-key update-information used after this is no longer a simple one which is simply based on input blocks, and the number of adaptable types of the intermediate-key is increased; thereby it is made difficult to decrypt the cipher document. When the processing using the F-function is completed and the next output of the F-function is inputted into said repeating steps, a new parcel of information is added to the intermediate-key update-information memory 83 and the old parcel is deleted.

Hereinafter, the third embodiment of the present invention is described. The third embodiment differs from the second embodiment in that, in the processing to generate the intermediate-key for the next conversion in the conversion means, it is provided with a function to carry out the update processing for generating the intermediate-key by using not only the intermediate-key update-information outputted from each conversion means coupled to the same step and initial-values of the intermediate-key stored in the intermediate-key initial-value memory, but also the intermediate-key update-information output by conversion means at different steps, and initial-values of the intermediate-key stored in the intermediate-key initial-value memory.

Figure 9:
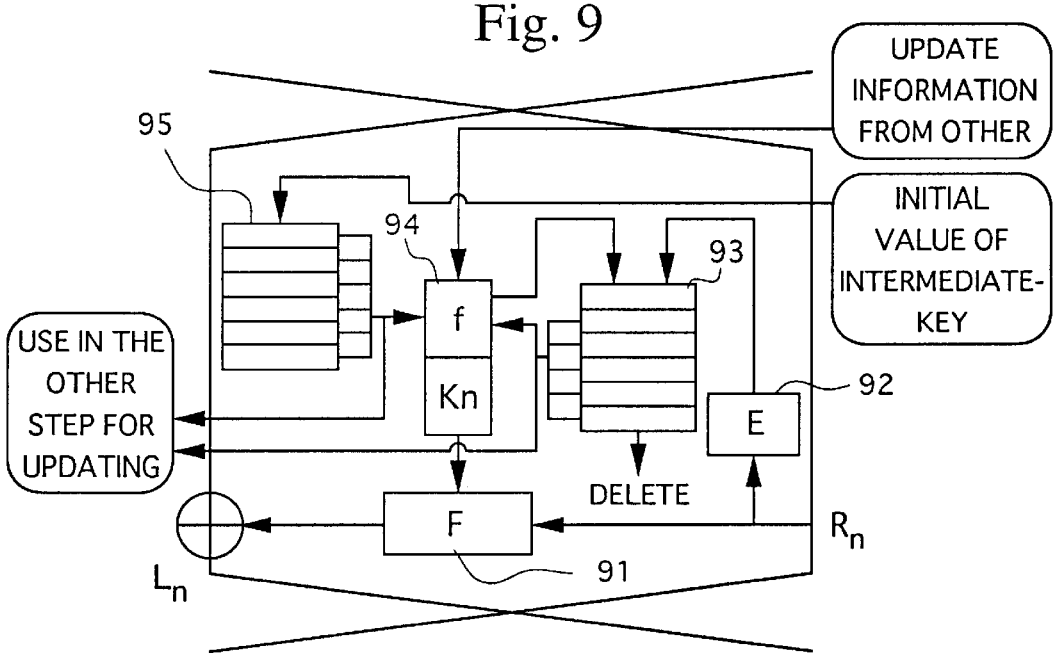
FIG. 9 is a diagram showing a key update system of the present invention, in which a parcel of the intermediate-key update-information is used over multiple steps.

FIG. 9 shows a step in the repeating steps of the encryption section which is modified from that of the second embodiment. The F-function 91 and the expansion permutation is the same as the F-function 81 and the expansion permutation E82, respectively, and the intermediate-key initial-value memory 95 is the same as the intermediate-key initial-value memory 85 in the second embodiment. In this embodiment, the input of the F-function is made the intermediate-key update-information, which is stored in the intermediate-key update-information memory 93. An initial-value of the intermediate-key generated by the key scheduler is stored in the intermediate-key initial-value memory 95. The intermediate-key update processor 94 processes the intermediate-key update processing for generating the intermediate-key to be used in the next processing, using intermediate-key update-information stored in the update-information memories 93 of the concerned step and of the adjacent steps, and the intermediate-key initial-values stored in the initial-value memories 95 of the concerned step and the adjacent step.

An example of a series of operations of the intermediate-key update processor 94 will be described. An initial-value of the intermediate-key will be selected from data stored in the initial-value memory 95 of the intermediate-key following the order of storing, and it is named $wk_1\_self$. A parcel of update-information among parcels of the oldest information stored in the update-information memory 93 is selected and is named $wk_2\_self$. Similarly, an initial-value stored in the intermediate-key initial-value memory in the adjacent steps is selected and named $wk1\_other$ and an parcel of the oldest information stored in an adjacent intermediate-key update-information memory is taken and named $wk2\_other$.

After calculating Kn $wk_1\_self + wk_2\_self + wk_1\_other + wk_2\_other$, the $K_n$ is assigned as the intermediate key.

This is an example of the operation f, and the present invention is not restricted to the above procedure. An example of setting the steps is to nominate in advance the step adjacent to the first step as the second step, and the step adjacent to the second step to the third step, . . . , and the step adjacent to the 16th step to the first step. It is possible to nominate alternatively a plurality of steps such that step adjacent to the first step is the second and 16th, step adjacent to the second step are the third and the first steps, . . . , and step adjacent to 16th step are the first and 15th. In addition, if desired, it can also be set such that the step adjacent to the first step is the fifth step.

In the example shown in FIG. 9, six parcels of the intermediate-key update-information are stored including a parcel of the newly stored information. That is, the oldest information is the expansion permutated input of the F-function at the repeated steps where the encryption of a block of a plaintext which is five blocks earlier is performed. A intermediate-key update processor 94 for generating 48 bits of an intermediate key produces an intermediate-key to control said F-function by using the input of five parcels of information excluding the newest parcel of information among these parcels which corresponds to a parcel of information to be processed using the F-function, a set of initial-values of the intermediate-key, five parcels of the intermediate-key update-information of five adjacent steps, and information stored in the set of the intermediate-key initial-values.

That is, an intermediate-key is produced based on the 5+6+5+6=22 parcels of information. The processing using the F-function is completed under the control of said intermediate-key, and when said step receives the next input of the F-function, a parcel of new information is added to the intermediate-key update-information memory 93 and the oldest parcel of information is deleted.

Hereinafter, the fourth embodiment of the present invention is described referring to FIG. 10. This embodiment differs from the second embodiment described above referring to FIG. 8 in that, in a processing for producing an intermediate-key to be supplied to the next conversion means, a function is added to restrict an identical initial-value from being selected successively more frequently than the total number of the conversion means.

Figure 10:
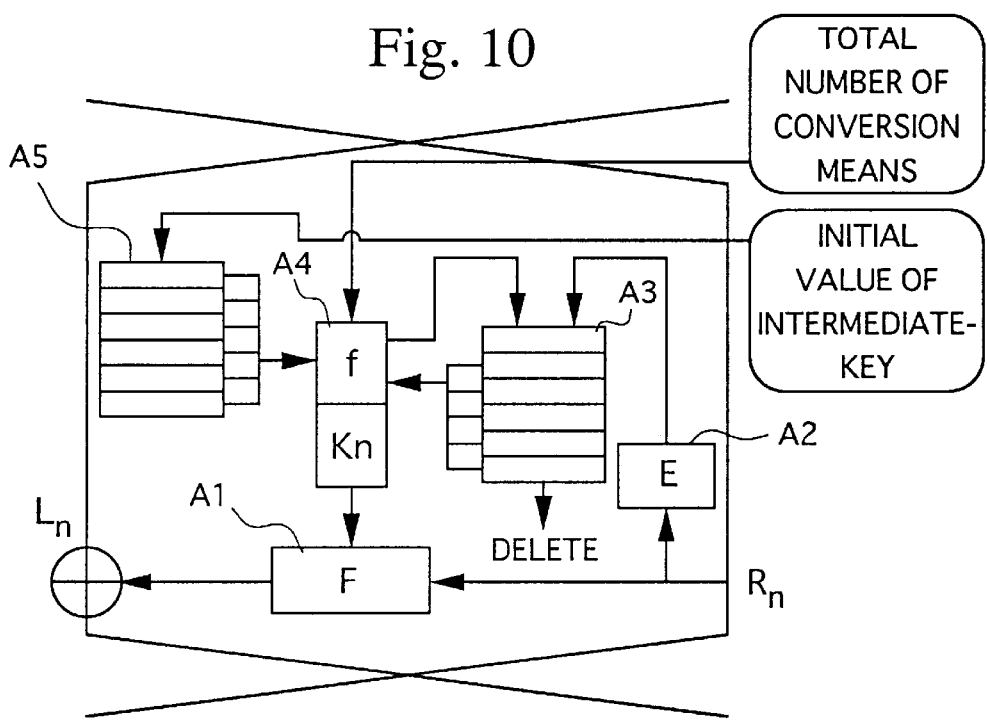
FIG. 10 is a diagram showing a key update system of the present invention which restricts an update cycle to less than a few steps.

FIG. 10 shows one of the steps in the repeating steps of the encryption portion which corresponds to a modified portion from that of the second embodiment. The F-function Al and the expansion permutation EA2 are the same as the Function 81 and the expansion permutation E82 of the second embodiment, and the intermediate-key initial-value memory A5 is the same as the intermediate-key initial-value memory 85 of the second embodiment. In the present embodiment, an input of the F-function is assigned as intermediate-key update-information, and the information, after applying the expansion permutation, is stored in the intermediate-key update-information memory A3. An initial-value of the intermediate-key generated by the key-scheduler is stored in the intermediate-key initial-value memory A5. Furthermore, an intermediate-key update processor A5 for producing the intermediate-key produces an intermediate-key to be used in he next processing by using initial-values of the intermediate-key stored in the intermediate-key update-information memory A3 and in the intermediate-key initial-value memory A5. In this embodiment, the total number of conversion means is fixed (16), so that the number of initial-values capable of being used continuously is set to be less than 15.

In the example shown in FIG. 10, six parcels of the intermediate-key update-information including the newest parcel are to be stored. That is, the oldest parcel of information is the input of the F-function after applying to the expansion permutation at the step where the encryption is carried out for the plaintext which is five block earlier. The intermediate-key update processor A4, for generating a 48 bit intermediate key produces an intermediate-key for controlling said F-function, based on the input of five parcels of information excluding the newest parcel of information produced by the input and to be processed using the F-function, and a set of initial-values of the intermediate-key. By repeating the procedure comprising finishing the processing using the F-function under the control of said intermediate-key, and transmitting the next input for the F-function to the step in the repeated steps, a new parcel of information is added in the memory A3, and the oldest parcel of information is deleted.

An example of a series of operation of the intermediate-key update processor A4 will be explained hereinafter. An initial-value among initial-values stored in the intermediate-key initial-value memory A5 is selected in due order of storing, and is designated $wk_1\_1$, and the oldest parcel of information stored in the intermediate-key update-information memory A3 is also taken out and is designated $wk_2$. After calculating $K_n = wk_1\_1 + wk_2$, $K_n$ is assigned as the intermediate-key. A record is made indicating that $wk_1\_1$ has been once used. When the next data is processed, an initial-value is taken out from stored initial-values in the intermediate-key initial-value memory A5 and is designated $wk_1\_1$ in due order of storing, and the oldest parcel of information is also taken out from parcels of information stored in the intermediate-key update-information memory A3 and is designated as $wk_2$. After calculating $K_n = wk_1\_1 + wk_2$, $K_n$ is assigned as the intermediate key. Although the first $K_n$ and the second $K_n$ use the same initial-value, the first $K_n$ uses a different intermediate-key update-information from the second $K_n$. Here, a record is made indicating that $wk_1\_1$ has been used twice. When this procedure is repeated whenever data is processed, it is understood at the time when processing has been completed 15 times that $wk1\_1$ was used 15 times. If the same $wk_1\_1$ is used in the next processing, $wk_1\_1$ will be used for 16 times which is the same number as the total number of the conversion means (16), so that, in the next processing, $wk_1\_1$ should be replaced with $wk_1\_2$ which is an initial-value of the intermediate-key stored at the next order of the $wk_1\_1$. In the following, the same procedures are repeated. The above procedure is one of the examples of a series of operations, and it should be understood that other procedures may be used without any limitation, In the above example, although the number of times for using one initial-value is restricted to not more than 15 times, other alternatives may be adopted. For example, a procedure may be constructed as follows. When the first 15 steps of a plaintext are processed, the first initial-value of each step is used; when the next 15 steps of the plaintext are processed, only the initial-value of the intermediate-key on the first step is replaced with the second initial-value; and when the next 15 steps of the plaintext is processed, only the initial-value of the intermediate-key on the first step is replaced with the third initial-value. After all of the initial-values on the first step is completely used, an intermediate-key initial-value on the second step is replaced with the second intermediate-key initial-value and the intermediate-key initial-value on the first step is restored to the first initial-value. As shown above, a procedure may be assumed in which an initial-value is not used successively by combining all of initial-values at every steps.

Hereinafter, the fifth embodiment of the present invention is described referring to FIG. 11. The fifth embodiment is a modified system of the second embodiment formed so as to solve a drawback of Japanese Patent Application, First Publication No. Hei 6-266284, in that updating of the intermediate-key is performed after the conversion means is in motion, that is, if a data block is input in the conversion means at a time t, and if the intermediate-key is updated at the time t, the updated intermediate-key acts only on data blocks after a time t+1. For that objective, the fifth embodiment updates the intermediate-key by adapting a parcel of the intermediate-key update-information used by the intermediate key processor from data blocks input into the conversion means.

Figure 11:
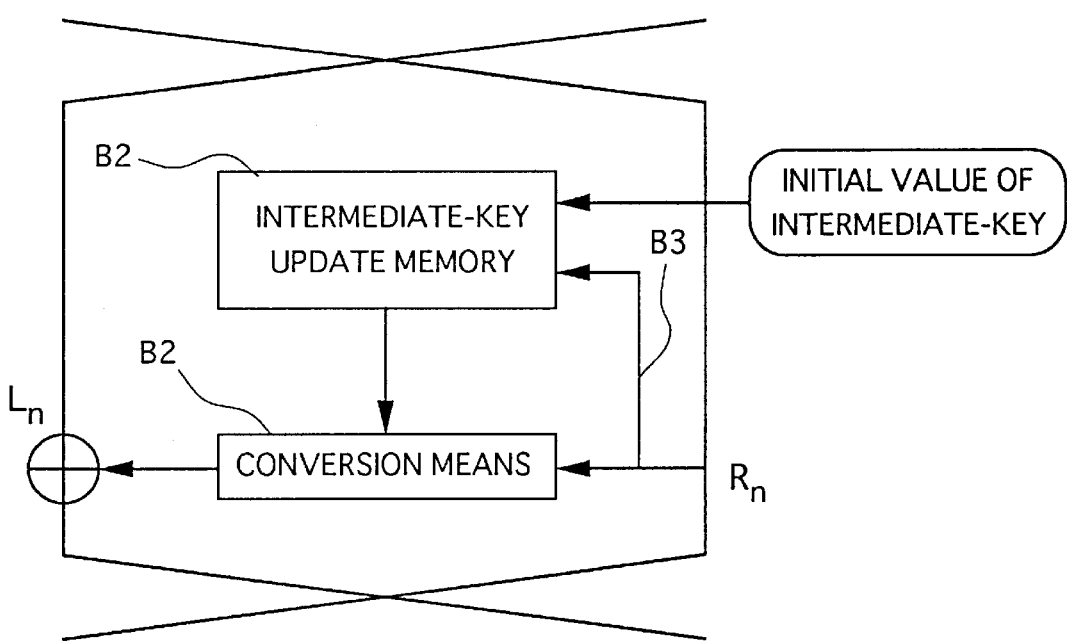
FIG. 11 is a diagram showing a key update system of the present invention which adopts the intermediate-key update-information from the input signal of the conversion means.

FIG. 11 is a conceptual diagram for explaining the operation of this embodiment. The conversion means B1 is the same as the F-function 71 in FIG. 7, and the intermediate-key update memory means B2 is defined to be comprised of the expansion permutation 72, the intermediate-key update-information memory 73, the intermediate-key update processor 74, and the intermediate-key initial-value memory 75. Whether (1) the intermediate-key update memory means B2 uses an updated intermediate-key for conversion of a data block which adopts the intermediate-key update-information in B3 or (2) the intermediate-key update memory means B2 does not use an updated intermediate-key for conversion of a data block which adopts the intermediate-key update-information in B3 is decided prior to the processing.

By keeping information about whether one of conditions (1) or condition (2) has been selected confidential from a cryptoanalyst, it is made more difficult for an cryptoanalyst to presume the intermediate-key applied to the conversion means B1.

Figure 12:
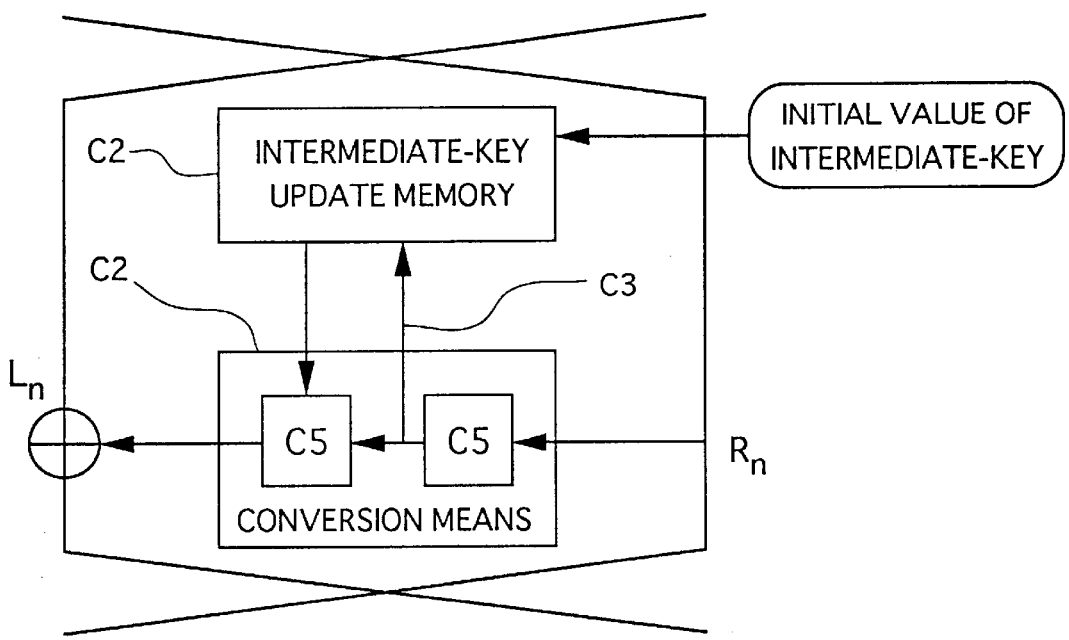
FIG. 12 is a diagram showing a key update system of the present invention which adopts the intermediate-key update-information from data en route of processing of the conversion means.

Next, the sixth embodiment is described referring to FIG. 12. This embodiment of the present invention is a modified system of the fifth embodiment formed so as to solve a drawback of Japanese Patent Application, First Publication No. Hei 6-266284, in that updating of the intermediate-key is performed after the conversion means is in motion, that is, if a data block is input into the conversion means at a time t, and if the intermediate-key is updated at the time t, the updated intermediate-key acts only on data blocks after a time t+1. For that objective, the sixth embodiment updates the intermediate-key by adapting an intermediate-key update-information used by the intermediate key processor for the updating from an intermediate data in the course of the conversion process by the conversion means.

FIG. 12 is a conceptual diagram showing an operation of this embodiment. A conversion means C1 comprises the two F-functions 71 of FIG. 7 connected to each other, and an intermediate-key update memory means C2 comprises an expansion permutation 72, an intermediate-key update-information memory 73, an intermediate-key update processor 74, and an intermediate-key initial-value memory 75. The conversion process of the conversion means C1 can be divided into two conversion means C4 and C5. That is, the conversion means C4 and the conversion means C5 are the same as the F-function 71 in FIG. 7. Whether the intermediate-key update memory C2 is used for conversion of a data block adopting the intermediate-key update-information in C3 (condition (1)), or the intermediate-key update memory C2 does not use for conversion of a data block adopting the intermediate-key update-information in C3 (condition (2)) is decided prior to the processing. In the case of decision (1), the intermediate-key used in C4 is set as 0, and in the case of decision (2), the intermediate-key used for C5 is set as 0.

It becomes more difficult to evaluate the intermediate-key by keeping the information about which the above condition (1) or (2) has been selected confidential from a crypotanalyst.

The seventh embodiment of the present invention will be described hereinafter referring to FIG. 13. This embodiment is a modified system of the fifth embodiment which updates the intermediate .key by adopting the intermediate-key update-information used by the intermediate-key update processor from the output data of the conversion means. The seventh embodiment of the present invention specifies the position for adopting the intermediate-key update-information complying with the fifth and sixth embodiments, and the system of this embodiment is suggested in the first embodiment indicated referring to FIG. 6.

Figure 13:
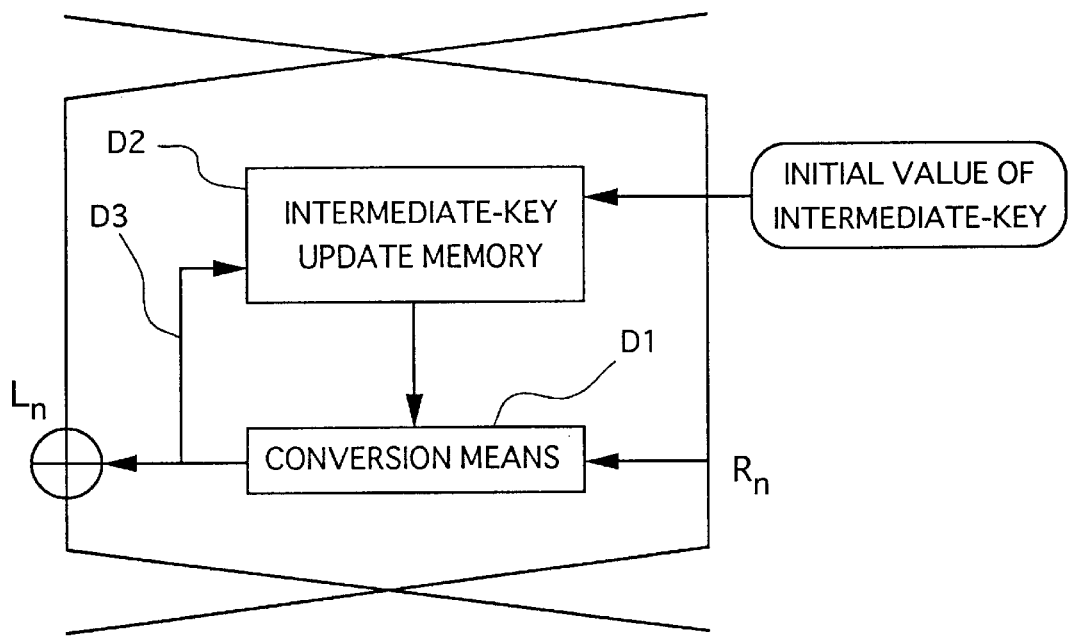
FIG. 13 is a diagram showing a key update system of the present invention which adopts the intermediate-key update-information from an output of the conversion means.

FIG. 13 is a conceptual diagram showing the operation of this embodiment.

A conversion means D1 is the same as the F-function 61 shown in FIG. 6, and an intermediate-key update memory means D2 may be designed to be comprised of the expansion permutation 62, the intermediate-key update processor 64, and the intermediate-key initial-value memory 63, shown in FIG. 6. When this construction is formed, the structure of this embodiment becomes identical with that of the first embodiment.

In turn, the conversion means D1 is the same as the F-function 71 in FIG. 7, and the intermediate-key update memory means D2 comprises the expansion permutation 72, the intermediate-key update-information memory 73, the intermediate-key update processor 74, and the intermediate-key initial-value memory 75, shown in FIG. 7. When this construction is formed, the structure becomes identical with that of the second embodiment, which corresponds to the example which does not use the intermediate-key updated by the intermediate-key update-information adopted from the output of the conversion means for conversion of the data block adopted the intermediate-key update-information.

A higher confidentiality can be secured by using the seventh embodiment than the case of the fifth and sixth embodiment, because the intermediate-key is produced from data which are mixed by the conversion means, which makes it difficult to assume the intermediate-key update-information.

Next, the eighth embodiment of the present invention is described, hereinafter. In this embodiment, each conversion means in the first, second, third, fourth, fifth, sixth, and seventh embodiments are processed in parallel.

However, as described below, in the case when parallel processing is performed as a combination of the third embodiment shown in FIG. 9 and the fifth embodiment shown in FIG. 11, processing (condition (1)) which uses the updated intermediate key for conversion of a data block which adopt an intermediate-key update-information is excluded. In a parallel processing performed in a combination of the third embodiment shown in FIG. 9 and the sixth embodiment shown in FIG. 12, processing (condition (1)) which uses an updated intermediate-key for conversion of a data block which adopts an intermediate-key update-information is excluded.

Respective processors are allocated for 16 encryption devices which have a function to produce $L_n$ and $R_n$ from $L_{n-1}$ and $R_{n-1}$ provided with respective one of F-function, among 18 pieces of conversion means excluding the initial permutation and the final permutation.

At first, 64 bits of an encryption key are input into the key scheduling section, and the key scheduling section produces an intermediate-key by the above operation and transmits them to the intermediate-key update memory.

Next, a 64 bits of the first plaintext is input into the initial permutation. After completion of the initial permutation, a result is transmitted to a conversion device having the first F-function, and the next 64 bits of the plaintext are inputted after completion of the transmission. The conversion device having the first F-function processes data from the initial permutation and immediately updates the intermediate-key by the above described procedure. Subsequently, the obtained data are transmitted to a conversion device having the second F-function and, after completion of the transmission, the next data are received by that conversion device.

Similarly, each conversion device processes data delivered from the previous conversion device and updates the intermediate-key, and after transmitting data to the following conversion device, the conversion device is ready to receive the input of data. The final step, that is, the final conversion device performs the final permutation for the received data and outputs a part of the ciphertext.

Each processor is operated in parallel. Thus, at the time when the next 64 bits are received by the first conversion device, after the initial 64 bits of a plaintext are processed by the first conversion device and the processed data are transmitted to the second conversion, the first 64 bits are processed at the second device in parallel. Similarly, each of 16 conversion devices having respective F-functions, the initial permutation, and the final permutation carry out processing operations in parallel.

Allocation of processors shown above is only an example and it is also possible to allocate a plurality of conversion means to a processor, for example, to allocate two F-functions to one processor.

As sown above, the first to the eighth embodiments of the present invention are described. The other embodiment can be assumed, in which, a plurality of encryption apparatuses is provided so as to be able to select an apparatus in order to comply with an object of the encryption. For example, an intensity-oriented encryption apparatus may be provided for an object to secure high confidentiality and a speed-oriented encryption apparatus may be provided for the task which requires high speed operation, which enables selecting an optimum apparatus to satisfy various objects.

Various encryption apparatuses are described above along with the first to the eighth embodiments, and hereinafter an embodiment will be described concerning a recording medium including a recorded program for operating the encryption apparatus of the present invention.

The recording medium including the program for operating the encryption apparatus is obtained by providing a program of the above functions of the encryption apparatus by use of a program language which can be read by a computer and by recording the program on a CD-ROM or a FD.

Additionally, the above recording medium may be a recording medium such as a hard disc provided in a server device, and the recording medium of the present invention can be obtained from the computer program stored in the recording medium by reading the program through a network.

As described above in detail, an encryption apparatus with high safety for concealing data in the data communication or data accumulation.

What is claimed is:

1. An encryption apparatus for producing a ciphertext string corresponding to a plaintext string based on an encryption key, said apparatus comprising:

at least one conversion means for performing linear or non-linear conversion of a bit string;

an intermediate-key generating means for generating an initial-value of an intermediate-key by performing linear or non-linear bit-string conversion for an inputted intermediate-key; and an intermediate-key memory means for updating and storing the intermediate-key using an intermediate-key update-information;

wherein at least one of said conversion means forming a pair with said intermediate-key memory means, at least one of said paired conversion means is subjected to control of an intermediate-key stored in said intermediate-key memory means and generates an intermediate-key update-information for updating the intermediate-key whenever the bit string conversion is performed and transmits said intermediate-key update-information to said intermediate-key memory means forming a pair with said conversion means;

said intermediate-key memory means further comprises an initial value memory for storing a predetermined number of the initial-values which are delivered from said intermediate-key generating means;

and said apparatus further comprises a selecting means for selecting at least one initial-value among initial-values stored in said intermediate-key memory means whenever the bit string conversion is performed, controlling the conversion means in a pair and updating the intermediate-key based on said intermediate-key update-information.

2. An encryption apparatus according to claim 1, wherein said intermediate-key memory means stores a predetermined number of at least one of the intermediate-key update-information delivered in the past; deletes the oldest intermediate-key update-information whenever receiving a new intermediate-key update-information, and generates an intermediate-key to transmit to the following conversion means from a set of the intermediate-key update-information and a set of the intermediate-key initial-values as an input.

3. An encryption apparatus according to claim 1, wherein the intermediate-key memory means provided with more than two conversion means and being coupled with another conversion means in addition to the conversion means which originally forms a pair comprises a selection means to select intermediate-key update-information and an initial-value of the intermediate-key from a set of parcels of intermediate-key update-information and a set of initial-values of the intermediate-key and generates an intermediate-key to be transmitted to the following conversion means by inputting at least one parcel of selected intermediate-key update-information or at least one of the initial-values, or at least one parcel of selected intermediate-key update-information and at least one of the initial-values.

4. An encryption apparatus according to claim 1, wherein the intermediate-key memory means provided with more than two conversion means and being coupled with another conversion means in addition to the originally coupled conversion means comprises a selection means to select intermediate-key update-information or an initial-value of the intermediate-key or a combination of at least one parcel of an intermediate-key update-information and an initial-value of the intermediate-key from a set of parcels of the intermediate-key update-information and a set of initial-values of the intermediate-key, and said selection means controls so as not to select at least one parcel of said intermediate-key update-information or an initial-value of the intermediate-key or a combination of at least one parcel of said intermediate-key update-information and an initial-value of the intermediate-key repeatedly more than the number of steps in the conversion means.

5. An encryption apparatus according to claims 1, wherein, when said conversion means generates intermediate-key update-information for updating the intermediate-key, said conversion means updates said intermediate-key update-information based on a bit string among bit strings for its input, excluding the intermediate-key to control said conversion means to said conversion means, and transmits the intermediate-key update-information to said intermediate-key memory means, and said intermediate-key update means sets a condition in advance about whether or not the updated intermediate-key is used for converting data blocks which adopted said intermediate-key update-information.

6. An encryption apparatus according to claims 1, wherein, when said conversion means generates intermediate-key update-information for updating said intermediate-key update-information, said conversion means updates said intermediate-key update-information based on bit strings generated in the course of generating bit strings for its output from the input bit strings, and said conversion means transmits the intermediate-key update-information to said intermediate-key memory means, and a condition is set in advance about whether or not the updated intermediate-key updated by said intermediate-key update means is used for conversion of data blocks which adopted said intermediate-key update-information.

7. An encryption apparatus according to claim 1, wherein, when said conversion means generates intermediate-key update-information for updating said intermediate-key update-information, said conversion means updates said intermediate-key update-information based on bit strings for the output of the conversion means, and transmits the intermediate-key update-information to said intermediate-key memory means, and a condition is set in advance about whether or not the updated intermediate-key updated by said intermediate-key update means is used for conversion of data blocks which adopted said intermediate-key update-information.

8. An encryption apparatus according to claims 1, wherein a plurality of plaintext is simultaneously subjected to encryption processing by operating each of said conversion means in parallel.

9. A recording medium including a recorded computer readable program for operating an encryption apparatus for generating a ciphertext string corresponding to a plaintext string of a plaintext based on an encryption key:

wherein said apparatus comprising:

at least one conversion means for performing linear or non-linear conversion of the bit string;

an intermediate-key generating means for generating an initial-value of the intermediate-key after performing linear or non-linear conversion for an inputted intermediate-key; and an intermediate-key memory means for updating the intermediate-key using the intermediate-key update-information;

wherein said recording medium has a recorded program to operate said encryption apparatus such that at least one of said conversion means coupled with said intermediate-key memory means, at least one of said coupled conversion means is subjected to control of an intermediate-key stored in said intermediate-key memory means and generates a parcel of the intermediate-key update-information for updating the intermediate-key whenever the bit string conversion is performed, and transmits said intermediate-key update-information to said intermediate-key memory means forming a pair with said conversion means; said intermediate-key memory means further comprises an initial value memory for storing a predetermined number of the initial-values which are delivered from said intermediate-key generating means; and said apparatus further comprises a selecting means for selecting at least one initial-value among the initial-values stored in said intermediate-key memory means whenever the bit string conversion is performed, controlling the conversion means in a pair and updating the intermediate-key based on said intermediate-key update-information.

10. A recording medium including a recorded computer readable program for operating said encryption apparatus according to claim 9, wherein said intermediate-key memory means coupled with a conversion means for transmitting said intermediate-key update-information stores a predetermined number of at least one parcel of the intermediate-key update information delivered in the past, deletes the oldest parcel of the intermediate-key update information, and generates an intermediate-key to be transmitted to the conversion means from an input of a set of stored parcels of the intermediate-key update information and a set of initial-values of the intermediate-key.

11. A recording medium including a recorded computer readable program for operating said encryption apparatus according to claim 9, wherein said intermediate-key memory means having more than two conversion means, and coupled with the other conversion means than the originally coupled means comprises a selection means to select an intermediate-key update-information and an initial-value of the intermediate-key from a set parcels of intermediate-key update-information and a set of initial-values of the intermediate-key, and said selection means generates an intermediate-key to be transmitted to the following conversion means by an input consisting of at least one parcel of said intermediate-key update-information or an initial-value of the intermediate-key or by an input of a combination of at least one parcel of said intermediate-key update-information and an initial-value of the intermediate-key.

12. A recording medium including a recorded computer readable program for operating said encryption apparatus according to claim 9, wherein said intermediate-key memory means comprising more than two conversion means, and being coupled with another conversion means in addition to the originally coupled means comprises a selection means to select an intermediate-key update-information or an initial-value of the intermediate-key or a combination of at least one parcel of an intermediate-key update-information and an initial-value of the intermediate-key from at a set of parcels of the intermediate-key update-information and a set of initial-values of the intermediate-key, and said selection means controls so as not to select at least one parcel of said intermediate-key update-information or an initial-value of the intermediate-key or a combination of at least one parcel of said intermediate-key update-information and an initial-value of the intermediate-key repeatedly exceeding the number of conversion means.

13. A recording medium including a recorded computer readable program for operating said encryption apparatus according to claim 9, wherein, when said conversion means generates intermediate-key update-information for updating the intermediate-key, said conversion means updates said intermediate-key update-information based on a bit strings among bit strings for its input excluding the intermediate-key to control said conversion means to said conversion means and transmits the intermediate-key update-information to said intermediate-key memory means, and said intermediate-key update means sets a condition in advance about whether or not the updated intermediate-key is used for converting data blocks which adopted said intermediate-key update-information.

14. A recording medium including a recorded computer readable program for operating said encryption apparatus according to claim 9, wherein, when said conversion means generates intermediate-key update-information for updating the intermediate-key, said conversion means updates said intermediate-key update-information based on a bit string among bit strings for its input excluding the intermediate-key to control said conversion means to said conversion means, and transmits the intermediate-key update-information to said intermediate-key memory means, and said intermediate-key update means sets a condition in advance about whether or not the updated intermediate-key is used for converting data blocks which adopted said intermediate-key update-information.

15. A recording medium including a recorded computer readable program for operating said encryption apparatus according to claim 9, wherein, when said conversion means generates intermediate-key update-information for updating the intermediate-key, said conversion means updates the intermediate-key update information based on the bit string to be an output of the conversion means, and said conversion means transmits the intermediate-key update-information to said intermediate-key memory means, and a condition is set in advance about whether or not the updated intermediate-key updated by said intermediate-key update means is used for conversion of data blocks which adopted said intermediate-key update-information.

16. A recording medium including a recorded computer readable program for operating said encryption apparatus according to claim 9, wherein a plurality of plaintext is simultaneously subjected to encryption processing by operating each of said conversion means in parallel.

* * * * *